Jan. 3, 1933.　　　O. SCHWEITZER　　　1,892,971
REGENERATIVE REVERBERATORY FURNACE
Filed Aug. 20, 1930
Fig. 1
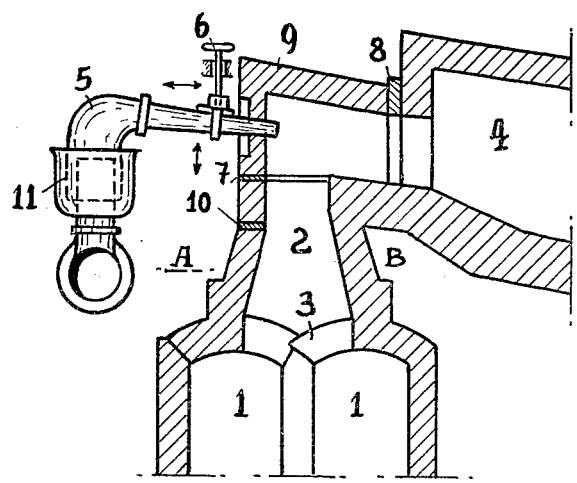
Fig. 2
Fig. 3
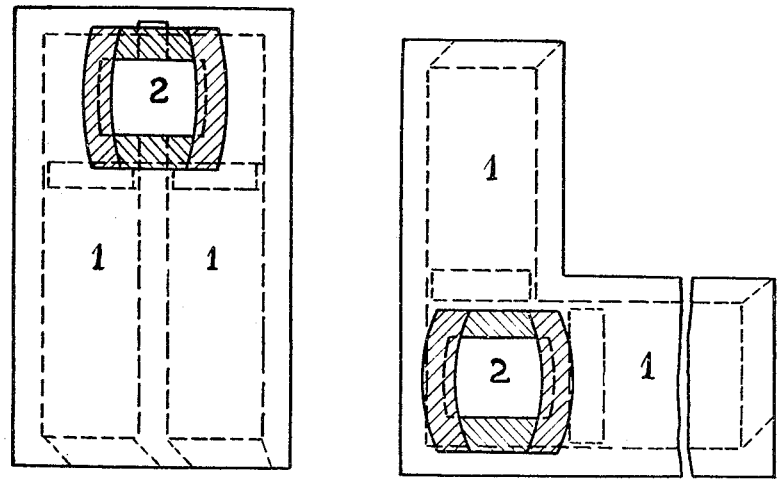
Inventor,
Otto Schweitzer,
by *F. W. Dahn,*
Attorney.

Patented Jan. 3, 1933

1,892,971

UNITED STATES PATENT OFFICE

OTTO SCHWEITZER, OF DORTMUND, GERMANY

REGENERATIVE REVERBERATORY FURNACE

Application filed August 20, 1930, Serial No. 476,656, and in Germany April 23, 1928.

The present invention relates to reverberatory furnaces heated with cold gas.

The modern regenerative reverberatory furnaces of this kind have the drawback, when two air chambers are provided, that two or more flues are led to the upper part of the furnace.

By this arrangement of two or more flues, the air chambers are not fully utilized and the air for combustion is heated to a different extent in the chambers. Furthermore multiple-flue furnaces such as are above referred to have the disadvantage of requiring more extensive repairs.

The object of the invention is to obviate this drawback. The invention consists in a regenerative reverberatory furnace heated with cold coke gas, in which for the purpose of heating all the air for combustion, two or more adjacently disposed regenerative chambers are arranged at the side of the furnace; the air from these chambers passes into the upper part of the furnace through a common passage, which is wider at the outlet from the chambers, or through which the waste gas is passed to the chamber to be heated. The passage is considerably wider at the outlet from the chambers to ensure an efficient delivery of the air and of the waste gases and also to prolong the life of the brickwork. The upper part of the common passage is arranged in known manner so as to be exchangeable by means of joints, the parts exposed to the greatest wear being protected by a cooling wall. The widening begins at the outer wall, preferably below the cooling wall.

Two modes of embodying the subject of the invention are shown in the accompanying drawing by way of example, in which Fig. 1 represents a cross section of a furnace according to the invention, Fig. 2 is a horizontal section on the line A—B of Figure 1.

Fig. 3 is a horizontal section corresponding to Fig. 2 showing a modification of the furnace.

Referring to the Figures 1 and 2 the two chambers 1 are connected by a common passage 2, which is considerably enlarged at the outlet 3 from the chambers and is connected by the removable upper part 9 of the furnace head with the upper furnace or hearth 4. The relatively light head can be exchanged by breaking the joints 7 and 8. As shown in Figures 1 and 2, the chambers have a common longitudinal wall. The gas nozzles 5 which open at one end into a common water seal 11 are adjustable vertically by means of an adjusting device 6 and can be moved inward or outward.

By Figure 3 a modification is shown having differently arranged chambers. In this construction the chambers 1 have a common intermediate chamber 2 (slag chamber) and are inclined to another, so that the longitudinal sides of the chamber are not in contact.

The inclination of the chambers may be varied in a suitable manner so that the longitudinal sides are only partially in contact.

I claim:

1. In a regenerative reverberatory furnace heated with cold combustible gas, the combination of a plurality of regenerative chambers at an end of the furnace for heating the air supplied for combustion, a slag chamber common to said regenerative chambers, and a tapering vertical passage comomon to said regenerative chambers and leading directly from the slag chamber to the upper part of the furnace, the wall of said passage at the side remote from said furnace sloping upward toward the furnace, said passage serving alternatively as the inlet for air required for combustion and as the outlet for waste gases for heating said chambers.

2. In a regenerative reverberatory furnace heated with cold combustible gas, the combination of a plurality of regenerative chambers at an end of the furnace for heating the air supplied for combustion, a slag chamber common to said regenerative chambers, and a tapering vertical passage common to said regenerative chambers and leading directly from the slag chamber to the upper part of the furnace, the wall of said passage next to the furnace and the wall of the passage most remote from the furnace sloping upward toward each other, said passage serving alternatively as the inlet for air required for combustion and as the outlet for waste gases for heating said chambers.

In testimony whereof I affix my signature.

OTTO SCHWEITZER.